United States Patent [19]

Blank et al.

[11] Patent Number: 4,599,487
[45] Date of Patent: Jul. 8, 1986

[54] CABLE GLAND

[75] Inventors: Wilhelm Blank, Speichersdorf; Ernst Roth; Reinhard Tellbach, both of Pegnitz, all of Fed. Rep. of Germany

[73] Assignee: Klein, Schanzlin & Becker Aktiengesellschaft, Frankenthal, Fed. Rep. of Germany

[21] Appl. No.: 717,325

[22] Filed: Mar. 29, 1985

[30] Foreign Application Priority Data

Apr. 5, 1984 [DE] Fed. Rep. of Germany ....... 3412786

[51] Int. Cl.[4] .................. H01B 17/30; H02G 15/013; F04D 29/08
[52] U.S. Cl. ..................................... 174/151; 174/18; 174/23 R; 174/76
[58] Field of Search .................... 174/18, 23 R, 65 R, 174/76, 77 R, 151, 152 R; 310/71, 87; 339/94 R, 94 A, 94 M, 126 RS; 417/422

[56] References Cited

U.S. PATENT DOCUMENTS

| 658,192 | 9/1900 | Sutter | 174/23 R X |
|---|---|---|---|
| 2,651,672 | 9/1953 | Ivanoff | 174/18 X |
| 2,655,638 | 10/1953 | Allen | 174/77 R X |
| 2,898,396 | 8/1959 | Watson | 174/23 R X |
| 3,839,596 | 10/1974 | Glover | 174/23 R X |
| 4,227,043 | 10/1980 | Stöhr et al. | 174/151 |
| 4,436,950 | 3/1984 | Gaffal et al. | 174/18 X |

FOREIGN PATENT DOCUMENTS

| 200636 | 11/1958 | Austria | 174/76 |
|---|---|---|---|
| 1913680 | 4/1965 | Fed. Rep. of Germany . | |
| 920721 | 3/1963 | United Kingdom | 174/76 |
| 1340423 | 12/1973 | United Kingdom | 174/152 R |

*Primary Examiner*—Laramie E. Askin
*Attorney, Agent, or Firm*—Peter K. Kontler

[57] ABSTRACT

A gland which is installed in the hole of a wall between two different atmospheres to prevent the leakage of a fluid from the one side to the other side of the wall along the outer sheath of an electric cable has a tubular metallic housing which is sealingly installed in the hole and into which the cable extends. The interior of the housing is filled with a hardened filler material which completely surrounds bare portions of conductors. Beads are formed on such bare portions. Sleeves are shrunk onto the bare portions of the conductors between the respective beads and insulators for the conductors. A tension reducing clamp surrounds the outer sheath of the cable in the housing. The aperture at one end of the housing contains an O-ring which is biased against the external surface of the outer sheath of the cable and against the surface surrounding the aperture by a second ring. The conductors are further surrounded by additional insulators which extend from the filler material by way of an open end of the housing. The beads are welded or soldered onto the bare conductors between the respective pairs of insulators.

13 Claims, 1 Drawing Figure

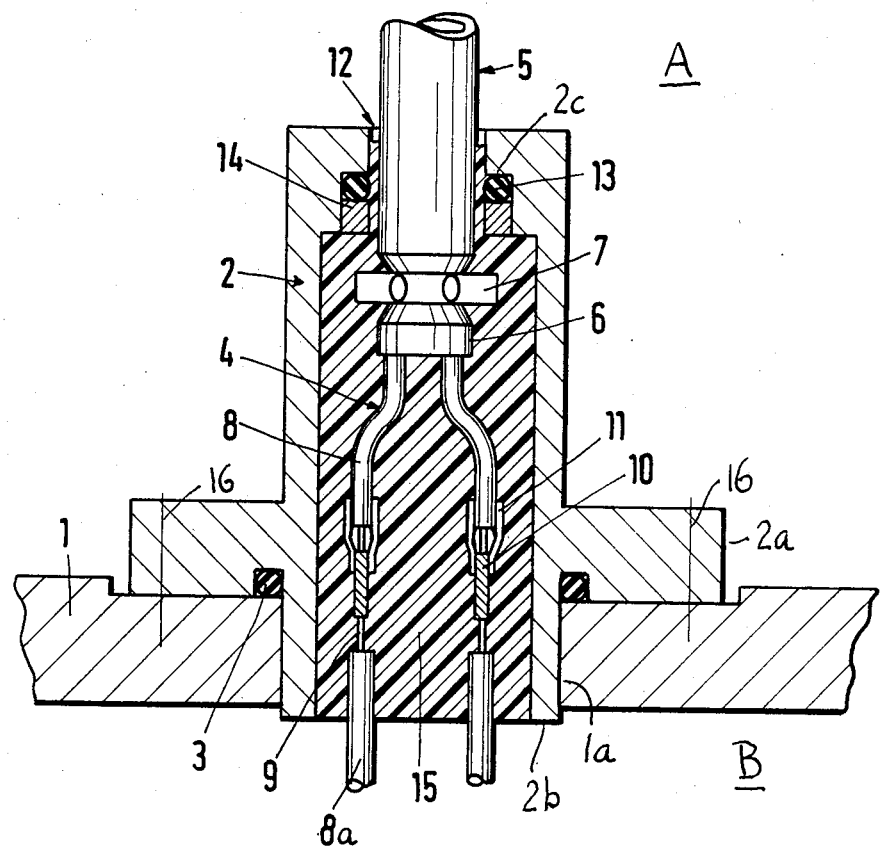

CABLE GLAND

BACKGROUND OF THE INVENTION

The present invention relates to cable glands, especially to improvements in cable glands which can be used to surround a portion of a cable in the hole of a partition or another wall that separates two different atmospheres, e.g., a gaseous and a liquid atmosphere, two different liquid atmospheres or a high-pressure atmosphere from a low-pressure atmosphere. Such glands can be used with particular advantage in submersible motor pumps wherein the cable is led out of the motor and is then caused to pass upwardly along the exterior of the pump and of the rising main.

The gland in a submersible motor pump should be sufficiently tight to prevent penetration of liquid into the housing of the electric motor which drives the pump and/or to prevent escape of the fluid from the interior of the motor housing into the surrounding atmosphere, e.g., into a liquid atmosphere well below the sea level. German Utility Model No. 19 13 680 discloses a rather complex cable gland wherein the exterior of a hollow cable is glued to a tubular shell and the exterior of the shell is bonded to a hose which is shrunk thereon. The shell is secured in the hole of a wall between two different atmospheres by a stuffing box. The stranded conductors of the cable are soldered to exposed soldering lugs. Such glands are not ideally suited for use in aggregates wherein a wall must completely separate two different atmospheres. One of the reasons is that any, even slightest, damage to the hollow cable permits leakage of fluid from the higher-pressure area to the lower-pressure area and/or undesirable mixing of the fluids at the opposite sides of the wall. Moreover, the safety which is offered by a stuffing box is rather limited, especially if the difference between the pressures at the opposite sides of the wall is very pronounced. Still further, aging of the material of the stuffing box is likely to result in leakage around the cable. Moreover, pronounced changes in temperature can entail the development of leaks as a result of unequal thermally induced expansion and/or contraction of different parts.

OBJECTS AND SUMMARY OF THE INVENTION

An object of the invention is to provide a simple and reliable cable gland which comprises a relatively small number of inexpensive parts and which can be used to prevent communication between all kinds of different atmospheres with the same degree of reliability.

Another object of the invention is to provide a cable gland which is less affected by aging than heretofore known cable glands.

A further object of the invention is to provide a cable gland which can be designed to withstand pressure differentials of desired magnitude and which is not unduly affected by abrupt and pronounced temperature changes.

An additional object of the invention is to provide a novel and improved construction for sealing the hole around an electric cable where the cable is caused to pass from one side to the other side of a wall which separates two different atmospheres from one another.

Still another object of the invention is to provide a cable gland which can be assembled with little loss in time and which continues to furnish an adequate seal even if certain of its components are damaged or destroyed.

A further object of the invention is to provide a cable gland which can be used as a superior substitute for conventional cable glands.

The invention is embodied in a gland serving to seal a hole or bore which is provided in a wall separating two different atmospheres and allows for the passage therethrough of at least one electrical conductor. The gland comprises a hollow housing (e.g., a metallic tube) which is sealingly secured to the wall, which extends through the hole and which has an aperture at one side of the wall and an open end at the other side of the wall. The one conductor extends through the housing and outwardly by way of the aperture as well as by way of the open end of the housing. The gland further comprises a sheath which partially surrounds the one conductor in the housing so that a portion of the one conductor remains bare, a solded, welded or otherwise affixed bead provided on the bare portion of the one conductor in the housing, an adhesive-coated sleeve which is shrunk onto the one conductor between the bead and the sheath so that the sleeve sealingly engages (e.g., surrounds) a portion of the sheath in the housing, an elastomeric seal element (e.g., an elastic O-ring) which sealingly surrounds the one conductor in the aperture and is in sealing engagement with the adjacent surface of the housing, and a mass of hardened filler material which fills the interior of the housing so that the bead, the bare portion of the one conductor and the sheath are embedded in the filler material. The mass of filler material can comprise a casting resin. The gland preferably further comprises an externally threaded ring or an unthreaded ring for biasing the sealing element in the aperture so that the sealing element remains in sealing engagement with the conductor (e.g., by way of the outer sheath of a cable which extends through the aperture and into the interior of the housing) and with the adjacent surface of the housing. The housing can be formed with an annular shoulder which is located in the aperture and against which the sealing element is urged by the biasing means.

The cable can contain the one conductor and at least one additional conductor which has a bare portion in the interior of the housing. Such gland further comprises an additional bead, an additional sheath and an additional sleeve for the second conductor. Still further, the gland can comprise a clamp or other suitable tension reducing means which is installed in the interior of the housing and deforms the end portion of the outer sheath of the cable, i.e., that sheath into which the discrete sheaths for the conductors extend.

The housing is preferably provided with an external flange which overlies the respective side of the wall at one end of the hole, and a set of screws, bolts or other suitable securing means for securing the flange to the wall in such a way that the two atmospheres (e.g., a high-pressure atmosphere and a low-pressure atmosphere) cannot communicate with each other along the exterior of the housing.

Each discrete sheath can comprise an arcuate portion in the interior of the housing; such arcuate portion extends between the outer sheath of the cable and the respective bead to further reduce the likelihood of the development of a leak through the housing in response to the application of a tensional stress to the conductor or conductors at the one and/or the other side of the wall.

The gland can comprise a second sheath for each conductor, and such second sheaths extend from the housing by way of the open end of the latter.

The novel features which are considered as characteristic of the invention are set forth in particular in the appended claims. The improved cable gland itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is an axial sectional view of a cable gland which embodies the invention and surrounds a cable having two electrical conductors.

DESCRIPTION OF THE PREFERRED EMBODIMENTS

The drawing shows a cable gland which is installed in the hole 1a of a wall 1 serving to separate two different atmospheres A and B from one another. For example, the pressure at the underside of the wall 1 (as viewed in the drawing) can greatly exceed the pressure at the upper side of the wall. Alternatively, the wall 1 can be used to separate a gaseous atmosphere from another gaseous atmosphere or from a liquid atmosphere. It is assumed that the wall 1 forms part of the housing of the motor in a submersible motor pump and that the improved gland is to prevent leakage of fluid between the two sides of the outer sheath 6 of an electric cable 5 which extends through the aperture 12 at one end of a tubular metallic housing 2 having an external flange 2a which is sealingly secured to the respective side of the wall 1 by a set of bolts, screws or analogous fasteners 16 (two indicated by phantom lines). The underside of the flange 2a has an annular groove for a sealing ring 3 which is deformed in response to tightening of the fasteners 16 so as to reliably prevent communication between the atmospheres A and B along the exterior of the housing 2.

The sheath 6 of the cable 5 surrounds two leads 4 each of which includes a conductor 9 and two tubular inner sheaths 8, 8a of insulating material. Those portions of the conductors 9 which are disposed between the respective inner sheaths 8, 8a are bare and are provided with welded, soldered or otherwise formed beads 10. That end portion of the outer sheath 6 which extends into the housing 2 is surrounded by a tension reducing clamp 7 of known design, and the inner sheaths 8 include arcuate portions which are adjacent to the clamp 7 and extend toward the respective beads 10. Each of the leads 4 is partially surrounded by an adhesive-coated shrunk sleeve 11 which surrounds the bare portion of the respective conductor 9 between the corresponding bead 10 and the adjacent end portion of the corresponding inner sheath 8. As shown, the end portions of each shrunk sleeve 11 actually surround parts of the respective bead 10 and the respective inner sheath 8. The inner sheaths 8a extend outwardly from the housing 2 by way of an open end 2b which is remote from the aperture 12. The purpose of the beads 10 is to prevent leakage of fluid along or within the conductors 9, especially if such conductors consist of strands of twisted wire. The sleeves 11 prevent leakage of fluid along the bare portions of the conductors 9 between the beads 10 and the adjacent end portions of the respective inner sheaths 8. As mentioned above, the sleeves 11 (for example, the internal surfaces of these sleeves) are coated with a suitable adhesive which causes the sleeves to sealingly adhere to the respective beads 10 as well as to the material of the respective inner sheaths 8. This even further reduces the likelihood of penetration of a fluid medium into the end portions of the inner sheaths 8 and into the interior of the cable 5. The illustrated gland is explosion-proof; therefore, portions of the beads 10 extend beyond the respective sleeves 11.

The surface surrounding the aperture 12 is formed with an annular shoulder 2c which spacedly surrounds the adjacent portion of the outer sheath 6 of the cable 5 and is in sealing contact with an elastomeric sealing element 13 in the form of an O-ring. The latter is maintained in compressed and deformed condition by a second ring 14 which is fitted into the aperture 12 and bears against the O-ring 13 with a requisite force to reliably prevent leakage of a fluid from the atmosphere A into the interior of the housing 2 or vice versa. The ring 14 can be formed with external threads to mate with internal threads of the housing 2 in the aperture 12. Alternatively, the ring 14 can be forcibly driven into the aperture 12 adjacent to the O-ring 13 so that the latter is reliably deformed even if the temperature of the outer sheath 6 and/or the housing 2 fluctuates within a wide range. For example, the ring 14 can be a force-fit or a press-fit in the aperture 12.

The improved cable gland further comprises a mass or body 15 of filler material which can comprise or consist of a casting resin and which completely fills the interior of the housing 2 so that the beads 10, the exposed parts of the inner sheaths 8, parts of the inner sheaths 8a, the sleeves 11, the end portion of the outer sheath 6 and the clamp 7 are fully embedded in the hardened filler material. The material of the mass 15 is such that it strongly and reliably adheres to the internal surface of the housing 2, to the ring 14, to the external surfaces of the sheaths 6, 8, 8a to the external surfaces of the sleeves 11, to the clamp 7 and to the bare portions of the conductors 9 between the beads 10 and the respective inner sheaths 8a. As shown, the filler material can form a relatively thin tube which surrounds the outer sheath 6 of the cable 5 within the rings 13, 14 and is surrounded by the uppermost part of the surface bounding the aperture 12. The material of the mass 15 preferably contains suitable fillers which compensate for differences between the thermal expansion coefficients of the material of the housing 2 and the remaining material of the mass 15.

Once the mass 15 is introduced into and is allowed to harden in the interior of the housing 2, the positions of the parts of the two leads 4 are fixed and the position of the ring 14 is also fixed. As mentioned above, the bias of the ring 14 upon the elastomeric O-ring 13 suffices to ensure the establishment of a reliable seal between the housing 2 and the ring 13 along the shoulder 2c. Moreover, the ring 13 bears against the adjacent tube of filler material or directly against the outer sheath 6 so as to reliably prevent the flow of fluids between the interior of the housing 2 and the atmosphere A. In other words, the position of the ring 14 cannot be adjusted when the interior of the housing 2 is filled with the hardened mass 15 of filler material. The material of the mass 15 strongly adheres to the sheaths 6, 8 and 8a so that the mass 15 reliably prevents penetration of fluids from the atmosphere B into the interior of the outer sheath 6 or vice versa. The material of the mass 15 also adheres to the ring 13 to even further reduce the likelihood of communication between the atmospheres A and B by way of the interior of the housing 2.

The feature that the ring 14 is at least partially embedded in the mass 15 is desirable and advantageous because this ensures that the initially selected bias of the ring 14 upon the O-ring 13 cannot be changed and, since the initial bias is selected with a view to account for anticipated temperature-induced shrinkage or expansion of the parts 2, 13, 14 and 6, the seal between the housing 2 and the cable 6, (i.e., the bare conductors 9 in the cable) remains intact for long periods of time. As a rule, the ring 14 is inserted into the aperture and its bias upon the ring 13 is selected by a suitable machine which can be adjusted to ensure highly accurate and optimum compression of the ring 13. The material of the O-ring 13 is preferably such that it can form a strong bond with the material of the mass 15. Moreover, such material should be sufficiently elastic to ensure the establishment of a reliable seal between the ring 13 and the tube of filler material within the rings 13 and 14 even if the thermal coefficient of the filler material deviates considerably from the thermal coefficient of the material of the housing 2. Thus, and even if the bond between the major part of the mass 15 and the internal surface of the housing 2 fails as a result of excessive deviations of the temperature from the anticipated range so that the fluid of the atmosphere B can penetrate into the housing 2, the ring 13 is capable of preventing the flow of such fluid into the atmosphere A or the flow of a fluid from the atmosphere A past the ring 13 and into the major part of the housing 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A gland for sealing a hole which is provided in a wall separating two different atmospheres and serves to allow for the passage of at least one electrical conductor, comprising a hollow housing sealingly secured to and extending through the hole of the wall, said housing having an aperture at one side of the wall and the one conductor extending through said housing and outwardly by way of said aperture; a sheath partially surrounding the one conductor in said housing so that a portion of the one conductor in the housing remains bare; a bead provided on the bare portion of the one conductor in said housing; a sleeve shrunk onto the one conductor between said bead and said sheath so that said sleeve sealingly engages the sheath; an elastomeric sealing element sealingly installed in said aperture and sealingly surrounding the one conductor in the aperture; and a mass of hardened filler material filling the interior of said housing so that said bead, the bare portion of the one conductor and said sheath are embedded in the filler material.

2. The gland of claim 1, wherein said housing comprises a metallic material and has an open end remote from said aperture and disposed at the other side of the wall, the one conductor extending from the housing by way of said open end.

3. The gland of claim 1, wherein said mass comprises a casting resin.

4. The gland of claim 1, further comprising means for biasing said sealing element against said housing and at least indirectly against the one conductor in said aperture.

5. The gland of claim 4, wherein said housing has an annular shoulder located in said aperture and surrounding the one conductor, said sealing element including an O-ring which bears against said shoulder.

6. The gland of claim 1 for a cable which includes the one conductor and an additional conductor and extends through said aperture and into the interior of said housing, further comprising an additional bead and an additional sheath for the other conductor and tension reducing means embedded in said mass and clampingly surrounding the cable in the interior of said housing.

7. The gland of claim 6, wherein the cable includes an outer sheath and the sheaths for the conductors extend from said outer sheath into the mass of filler material in said housing.

8. The gland of claim 1, wherein said housing has an external flange and further comprising means for sealingly securing said flange to the wall so as to prevent communication between the two atmospheres along the exterior of said housing.

9. The gland of claim 1, wherein said sheath includes an arcuate portion in the interior of said housing.

10. The gland of claim 1, wherein said housing includes a metallic tube.

11. The gland of claim 1, wherein said housing has an open end remote from said aperture and further comprising a second sheath surrounding the one conductor in said housing and extending outwardly through said open end.

12. The gland of claim 1, wherein said mass includes a portion which adheres to said sealing element.

13. The gland of claim 12, further comprising means for biasing said sealing element against said portion of said mass and against said housing, said biasing means being partially surrounded by said mass.

* * * * *